United States Patent
Jeong

(10) Patent No.: US 6,396,786 B2
(45) Date of Patent: May 28, 2002

(54) METHOD OF PROCESSING DATA OF DEFECT SECTOR IN A DVD-RAM SYSTEM AND THE DVD-RAM SYSTEM

(75) Inventor: Jong-Sik Jeong, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/794,081

(22) Filed: Feb. 28, 2001

Related U.S. Application Data

(62) Division of application No. 09/222,829, filed on Dec. 30, 1998, now Pat. No. 6,275,456.

(30) Foreign Application Priority Data

Dec. 31, 1997 (KR) .............................................. 97-80543

(51) Int. Cl.[7] .............................................. G11B 7/005
(52) U.S. Cl. ................................ 369/53.31; 369/47.14; 369/53.17
(58) Field of Search ................. 369/47.14, 53.16–53.17, 369/32, 30.21–30.25, 53.31, 59.25; 360/39, 47, 48, 53; 714/8 MS; 711/118 MS, 122 MS, 147 MS, 153 MS; 710/56 MS, 57 MS

(56) References Cited

U.S. PATENT DOCUMENTS

| | | | |
|---|---|---|---|
| 5,111,444 A | * | 5/1992 | Fukushima et al. |
| 5,237,553 A | * | 8/1993 | Fukushima et al. ........... 369/58 |
| 5,526,335 A | * | 6/1996 | Tamegali ...................... 369/58 |
| 5,648,954 A | * | 7/1997 | Satoh ....................... 369/275.1 |
| 5,732,050 A | * | 3/1998 | Horie .......................... 369/32 |
| 5,758,191 A | * | 5/1998 | Kasebayashi et al. |
| 5,805,547 A | * | 9/1998 | Yamamuro .................... 369/58 |
| 6,014,350 A | * | 1/2000 | Tamegai ...................... 369/32 |
| 6,025,966 A | * | 2/2000 | Nemazie et al. .............. 360/53 |
| 6,029,209 A | * | 2/2000 | Cornaby et al. ............... 710/5 |
| 6,052,348 A | * | 4/2000 | Belser et al. ................. 369/54 |
| 6,105,070 A | * | 8/2000 | Gaylord |

* cited by examiner

Primary Examiner—W. R. Young
(74) Attorney, Agent, or Firm—Staas & Halsey LLP

(57) ABSTRACT

A method of processing data of a defect sector in a DVD-RAM (Digital Video Disk-Random Access Memory) system and the DVD-RAM system. In the method, a defect list is read from a lead-in area of a DVD-RAM disk during playback of the disk. The defect list is stored in a predetermined area of a memory of a signal processing portion in the system while the predetermined area of the memory is not full and a remaining part of the defect list is stored in an ATAPI (AT Attachment Packet Interface) buffer memory once the predetermined area of the memory is full. A sector having the title of a user-input file is searched, a physical sector address for the searched sector is designated, the defect list is read, and it is determined whether the physical sector address is in the defect list. Then, sector data corresponding to the physical sector address is stored in the memory of the signal processing portion if the physical sector address is not in the defect list, and otherwise, no sector data corresponding to the physical sector address is stored in the memory.

14 Claims, 6 Drawing Sheets

| PHYSICAL SECTOR ADDRESS | DATA OF 2366 BYTES | PHYSICAL SECTOR ADDRESS | DATA OF 2366 BYTES | ... |

FIG. 1 PRIOR ART

METHOD OF PROCESSING DATA OF DEFECT SECTOR IN A DVD-RAM SYSTEM AND THE DVD-RAM SYSTEM

This application is a divisional of application Ser. No. 09/222,829, filed Dec. 30, 1998, now U.S. Pat. No. 6,275,456.

CROSS-REFERENCE TO RELATED APPLICATIONS

This application claims the benefit of Korean Application No. 80543/1997, filed Dec. 31, 1997, in the Korean Patent Office, the disclosure of which is incorporated herein by reference.

BACKGROUND OF THE INVENTION

1. Field of the Invention

The present invention relates to a DVD-RAM (Digital Video Disk-Random Access Memory) system, and in particular, to a method of processing the data of a defect sector referring to a defect list having physical defect information on a disk.

2. Description of the Related Art

In general, a disk has defect areas unavailable for recording data due to physical causes in a DVD-RAM system. Such defect areas are empty of data and their smallest unit is a data sector. A sector in a defect area is called a defect sector, and the information of the defect sector is generally stored in a lead-in area of a DVD-RAM disk.

FIG. 1 illustrates a data format for a general DVD-RAM disk, with a physical sector address preceding data to be error-corrected.

Since the information of a defect sector in the lead-in area is stored in an additional defect information memory, it is determined whether a physical sector address for each sector data indicates a defect sector referring to a defect list having the information of defect sector data in the defect information memory when the physical sector address shown in FIG. 1 is read during a playback of the DVD-RAM disk in the DVD-RAM system. If the physical sector address does not indicate a defect sector, the data following the physical sector address is stored in an error correction memory and subjected to error correction.

FIG. 2 is a block diagram of a signal processing portion 236 in the general DVD-RAM system to which the present invention is applied. Referring to FIG. 2, a memory 224 serves as an error correction memory and stores data in 16 data sector units. A microcomputer interface 226 interfaces data transmitted between components of the signal processing portion 236. A microcomputer 228 controls the entire operation of the signal processing portion 236 as well as that of the DVD-RAM system.

When reproducing a disk 200, a disk motor 204 starts to rotate at a constant linear velocity, and an optical pickup 202 including a head converts disk information to an analog high frequency signal. The analog high frequency signal is converted to a pulse wave signal and a data stream EFM is applied to a 32-bit shift register 206. The lower 16 bits of 32 bits output from the 32-bit shift register 206 are provided to a 16-to-8 demodulator 208. The 16-to-8 demodulator 208 converts the received 16-bit data to 8-bit data as one symbol because data was 8-to-16 modulated during recording.

A physical sector address detector 230 detects a physical sector address from the data received from the 16-to-8 demodulator 208. A physical sector address error corrector 234 corrects errors of the physical address received from the physical sector address detector 230. A data address detector/error corrector 232 detects a data address from the data received from the 16-to-8 demodulator 208 and corrects errors of the data address. A sync detector 210 detects various sync patterns like a frame sync signal being a standard signal for controlling the rotation of the disk 200, a sector sync signal for differentiating sectors, and an error correction sync signal for reading the data of a corresponding error correction block by finding out an error correction time point, and generates sync signals.

A descrambler 214 descrambles scrambled data recorded on the DVD to return the scrambled data to the state prior to scrambling. An error detector 216 detects errors from the data received from the descrambler 214. A deinterleaves 218 deinterleaves data interleaved in frame units to return the data to its original arranged state by controlling a write/read address of the memory 224. An ATAPI (AT Attachment Packet Interface) interface 222 interfaces data between a signal processing portion 236 and a computer. AN ATAPI buffer memory 238 temporarily buffers the data interfaced between the computer and the signal processing portion 236. A memory controller 220 stores data read from the disk 200 in the memory 224 in 16 sector units. An error corrector 212 corrects errors of a predetermined block having data read from the disk. A defect information memory 240 stores a defect list having information of defect sectors read from the lead-in area of the disk 200.

As shown in FIG. 2, the defect information memory is additionally provided in the prior art to store the defect sector information, thereby requiring an additional memory access means for controlling the defect information memory and increasing the number of memories.

SUMMARY OF THE INVENTION

An object of the present invention is to provide a method for processing the data of a defect sector, which can reduce the number of memories by storing a defect list in a predetermined area of a memory of a conventional DVD-RAM system.

Additional objects and advantages of the invention will be set forth in part in the description which follows and, in part, will be obvious from the description, or may be learned by practice of the invention.

To achieve the above and other objects and advantages, there is provided a method for processing the data of a defect sector in a DVD-RAM system. In the method, a defect list is read from a lead-in area of a DVD-RAM disk during playback of the disk and stored in a predetermined area of a memory of a signal processing portion in the system. A sector having the title of a user-input file is searched, a physical sector address for the searched sector is designated, the defect list is read, and it is determined whether the physical sector address is in the defect list. Then, sector data corresponding to the physical sector address is stored in the memory of the signal processing portion if the physical sector address is not in the defect list, and otherwise, no sector data corresponding to the physical sector address is stored in the memory.

BRIEF DESCRIPTION OF THE DRAWINGS

The above and other objects and advantages of the present invention will become more apparent by describing in detail a preferred embodiment thereof with reference to the attached drawings in which:

FIG. 1 illustrates a data format for a general DVD-RAM disk;

DETAILED DESCRIPTION OF THE PREFERRED EMBODIMENT

Figure 2:
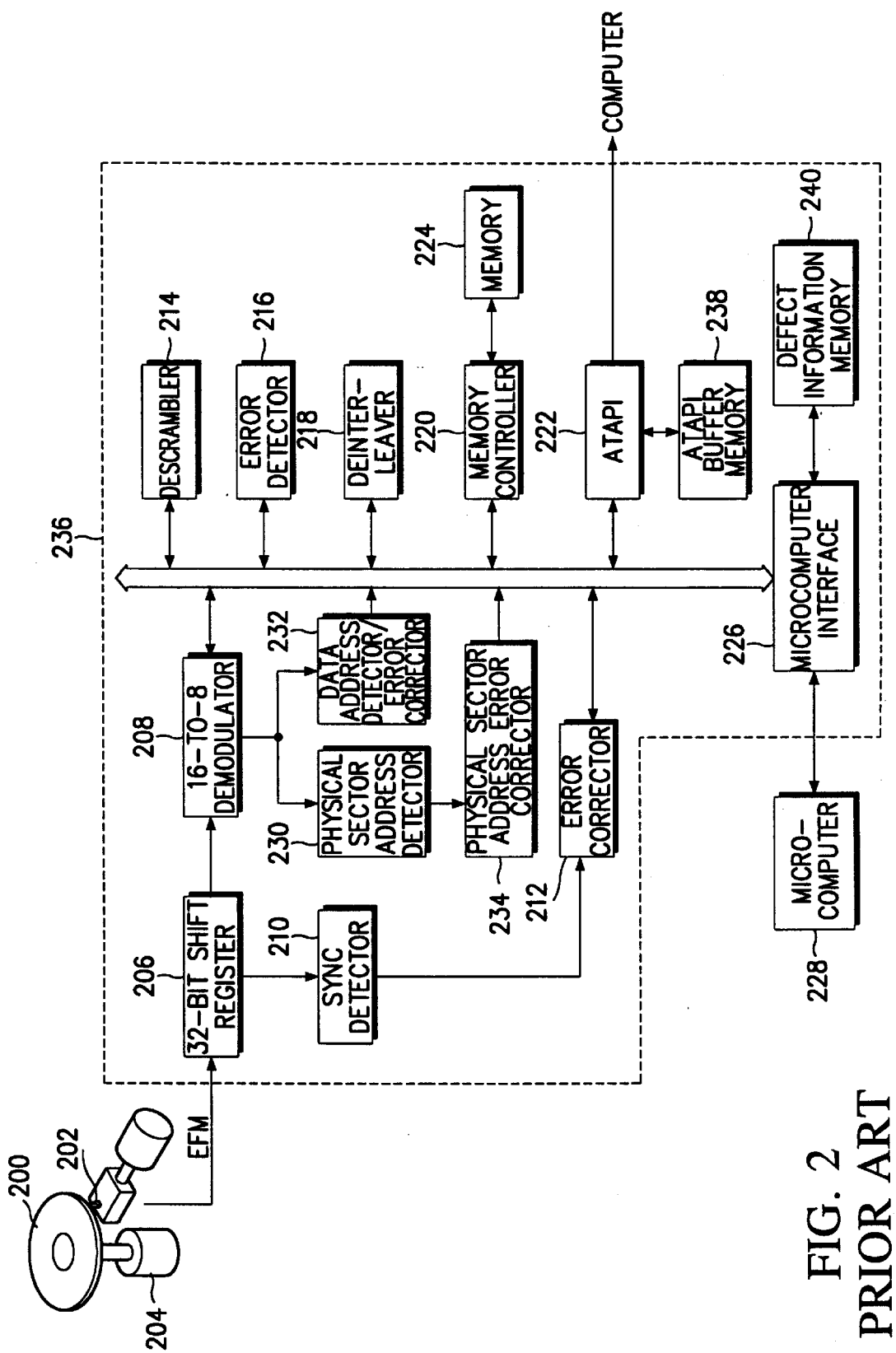
FIG. 2 is a block diagram of a signal processing portion in a conventional DVD-RAM system.
Figure 3:
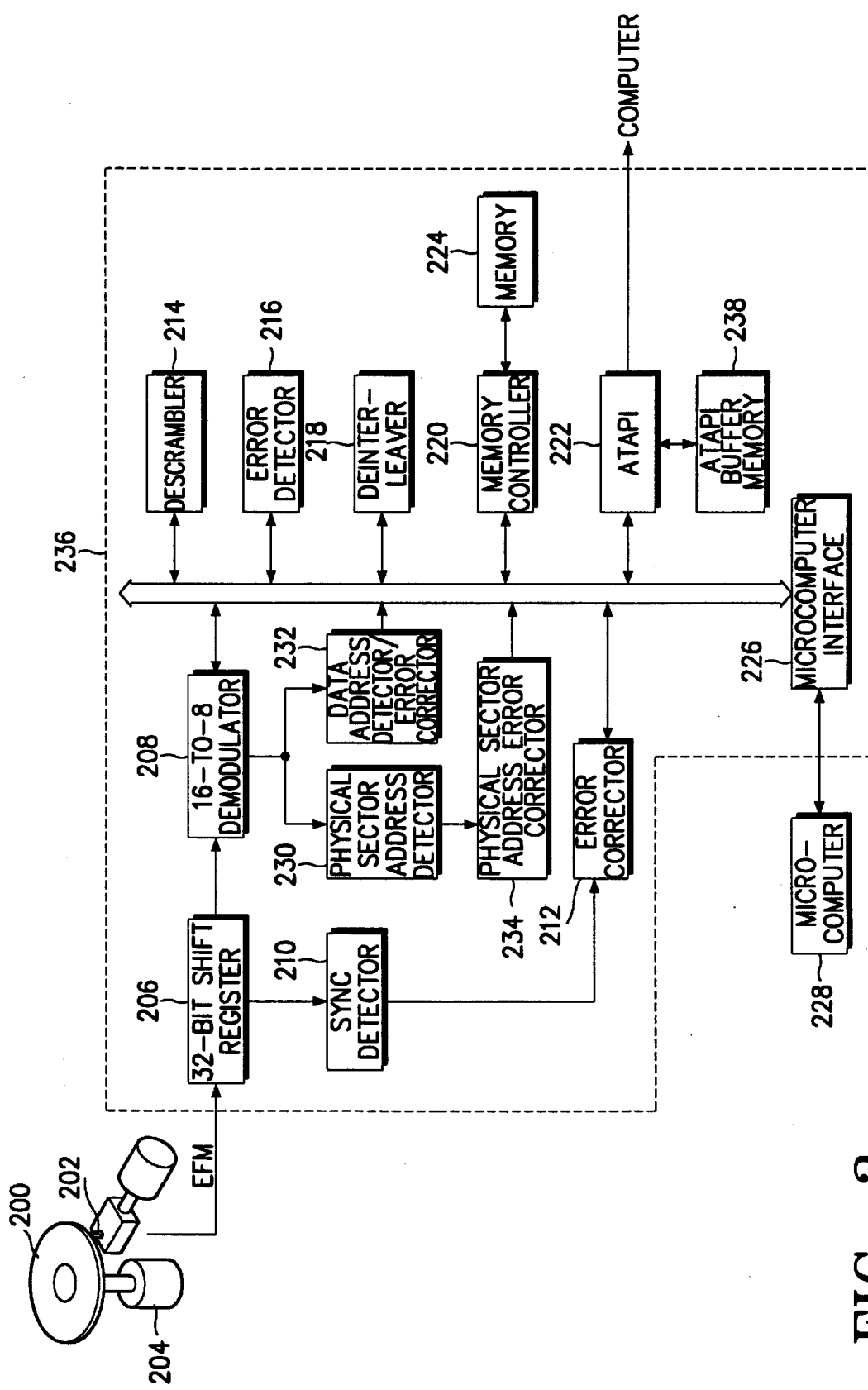
FIG. 3 is a block diagram of a signal processing portion in a DVD-RAM system according to an embodiment of the present invention.

FIG. 3 is a block diagram of a DVD-RAM system according to an embodiment of the present invention. The DVD-RAM system is similar to the conventional one except that a defect list is stored in both the memory 224 and the ATAPI buffer memory 238, and the defect information memory 240 is omitted. The other blocks except for the memory 224 in FIG. 3 are operated in the same manner as those of FIG. 2 and their functions will not be described here.

Figure 4:
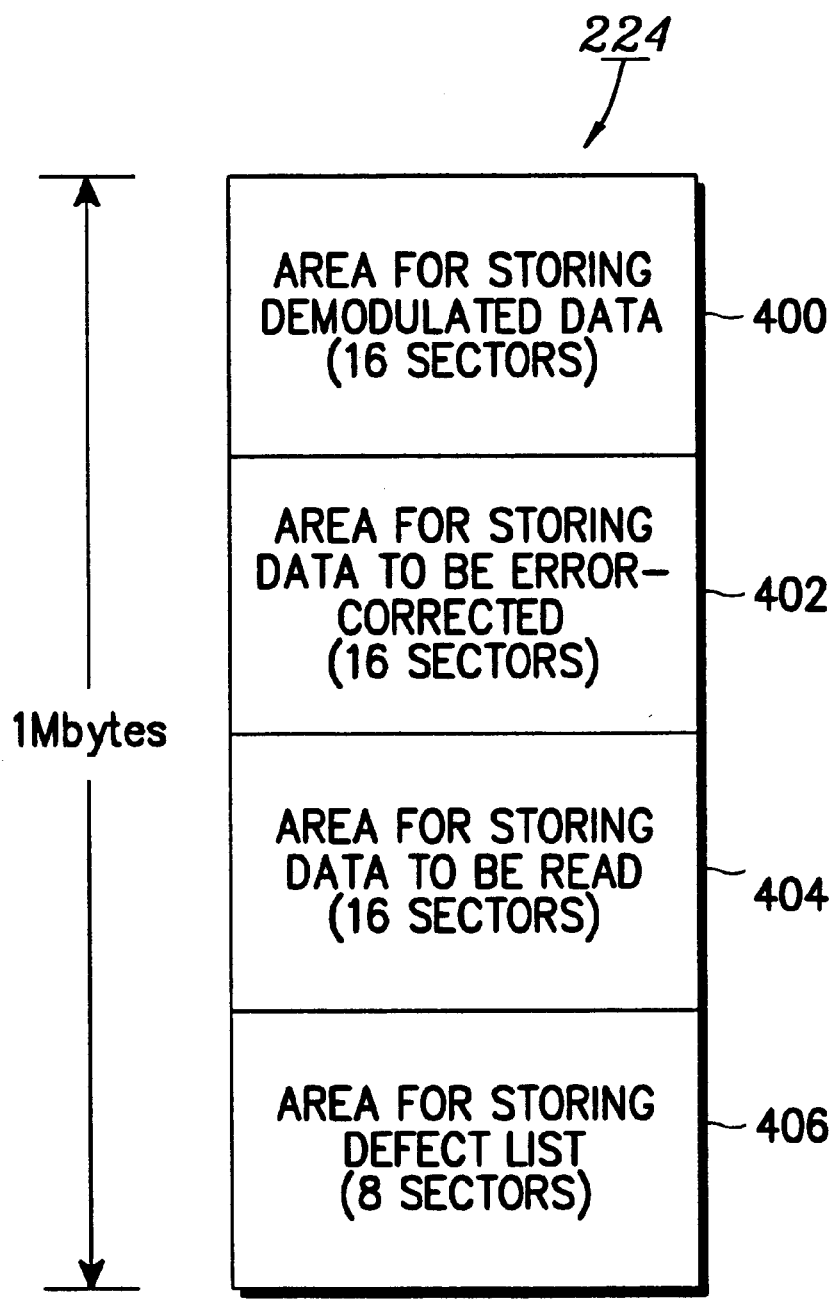
FIG. 4 schematically illustrates a data storage structure of a memory in the signal processing portion according to the embodiment of the present invention.

FIG. 4 illustrates the data storage structure of the memory 221 according to the embodiment of the present invention. Referring to FIG. 4, the memory 224 is divided into four areas: a first area 400 for storing demodulated data in 16 sector units; a second area 402 for storing data to be error-corrected; a third area 404 for storing data to be read as a final result; and a fourth area 406 for storing the defect list according to the embodiment of the present invention. In the general DVD-RAM system, the memory 224 usually has a capacity of one Mbytes and the demodulated data, error correction data, and data to be read as a final result are stored respectively in 16 sector units (16 sectors=one error correction block=37,856 bytes). Since there are 17 memory addresses in the memory 224, a total memory storage capacity is $2^{17}$, that is, 131,072 bytes. About 17,504 bytes, that is, eight sectors with one sector having 2048 bytes are allocated to the fourth area 406 by subtracting a memory capacity allocated to the first three areas 400, 402, and 404 from the total memory capacity. Therefore, 8-sector information of the defect list at a maximum can be stored in a predetermined area of the memory 224 of the signal processing portion 236. Though the maximum size of a defect list designated in the general DVD-RAM disk format reaches 46 bytes, that is, 32 sectors, the physical defect information of most DVD-RAM disks occupies 16 or less Kbytes, that is, eight or less sectors, Thus, the defect list can be processed by use of the memory 224. If the physical defect information exceeds 16 Kbytes, the remaining part of the defect list is stored in the ATAPI buffer memory 238 for the ATAPI 222 and applied to the memory controller 220 in the signal processing portion 236.

Figure 5:
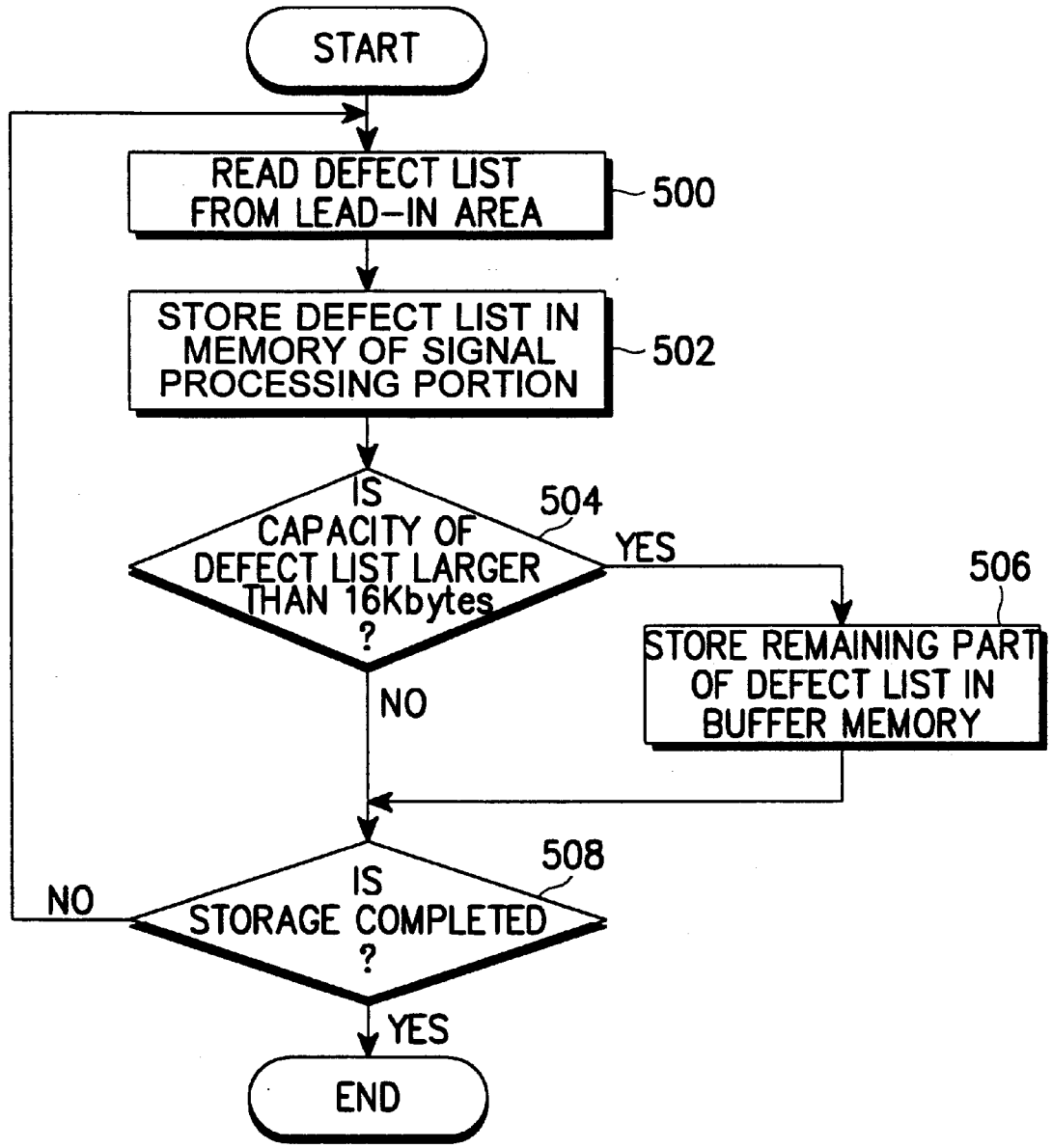
FIG. 5 is a flowchart for storing a defect list according to the embodiment of the present invention.

FIG. 5 is a flowchart for storing a defect list in a lead-in area according to the embodiment of the present invention. The flowchart is programmed in advance to be implemented by the microcomputer 228. Referring to FIGS. 3 and 5, the defect list storing procedure will be described in detail.

If the disk 200 is loaded, the microcomputer 228 reads a defect list from the lead-in area of the disk 200, in step 500. The microcomputer 200 stores the read defect list in the memory 224 of the signal processing portion 236, in step 502, and determines whether the defect list occupies 16 or more Kbytes, in step 504. If the capacity of the defect list exceeds 16 Kbytes, the microcomputer 228 stores part of the defect list in the memory 224 of the signal processing portion 236 and the other part thereof in the ATAPI buffer memory 238, in step 506. On the contrary, if the capacity of the defect list is 16 or less Kbytes in step 504, the microcomputer 228 determines whether the defect list is completely stored, in step 508. If the defect list is not completely stored, steps 500 to 508 are performed. If the defect list is completely stored, the microcomputer 228 terminates the defect list storage procedure.

Use of the memory 224 and the ATAPI buffer memory 238 in the signal processing portion 236 is sufficient for storing the defect list, thereby obviating the need for an additional memory.

Figure 6:
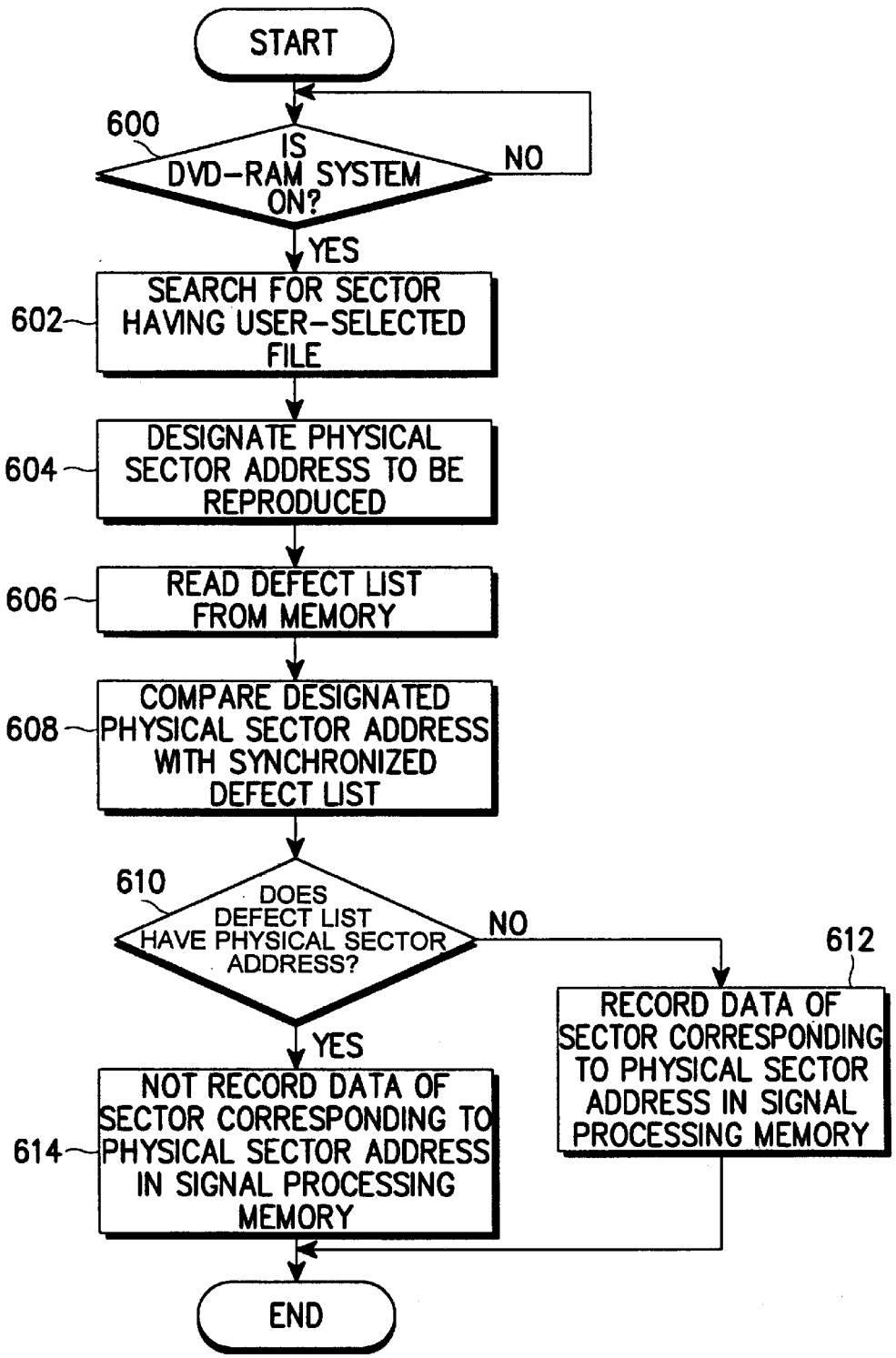
FIG. 6 is a flowchart for processing the data of a defect sector according to the embodiment of the present invention.

FIG. 6 is a flowchart for processing the data of a defect sector in the DVD-RAM system according to the embodiment of the present invention. The defect sector processing procedure will be described by referring to FIGS. 3 and 6.

When a user is to obtain intended data from the DVD-RAM disk, he turns on the DVD-RAM system and inputs the title of an intended file, in step 600. Then, the microcomputer 228 searches for a sector including the file title in step 602, and designates a physical sector address for the searched sector in step 604. The microcomputer 228 reads out the defect list from the memory 224 or the ATAPI buffer memory 238 in step 606. In step 608, the microcomputer 228 compares the physical sector address with the synchronized defect list read in step 606. If the defect list does not have the physical sector address, the microcomputer 228 stores sector data corresponding to the physical sector address in the memory 224, in step 612. On the contrary, if the defect list has the physical sector address, the microcomputer 228 does not store the sector data corresponding to the physical sector address in the memory 224 of the signal processing portion 236, in step 614.

Therefore, use of predetermined areas of the memory 224 and the ATAPI buffer memory 238 is sufficient for storing the defect list, thereby obviating the need for an additional memory.

While the present invention has been described in detail with reference to the specific embodiment, it is clearly to be noted that many variations can be made by anyone skilled in the art within the scope and spirit of the present invention.

What is claimed is:

1. A method of processing data of defect sectors in a data storage system, comprising the steps of:

reading a defect list in a lead-in area of a disk during playback of the disk, the defect list being indicative of defect areas of the disk;

storing the defect list in a predetermined area of a memory of a signal processing portion in the data storage system while the predetermined area of the memory is not full; and storing a remaining part of the defect list in a buffer memory once the predetermined area of the memory is full.

2. The method as claimed in claim 1, wherein the memory of the signal processing portion includes a first area to store demodulated data read from the disk, a second area to store data to be error corrected, a third area to store error corrected data to be read out from the data storage system, and the predetermined area.

3. The method as claimed in claim 1, wherein:

the data storage system is a digital optical data storage system; and the disk is an optical disk.

4. A data storage system which reads a defect list read from a lead-in area of a disk and from the disk during a playback mode, the system comprising:
  a memory which includes a first area storing demodulated data read from the disk, a second area which stores data to be error corrected, a third area which stores error corrected data to be read out from the data storage system, and a fourth area of predetermined capacity which stores the defect list until the predetermined capacity is full;
  a buffer memory which temporarily stores data which interfaces between the data storage system and an external device, said buffer memory storing a remaining part of the defect list if the fourth area of said memory is full; and
  a processing unit to control the storing of the defect list in said memory and said buffer memory.

5. The data storage system as claimed in claim 4, wherein the fourth area of said memory has the predetermined capacity of 8 sectors, each sector having 2048 bytes.

6. The data storage system as claimed in claim 4, wherein said processing unit receives a title of a file from a user, designates a physical sector address of a sector of the disk having the title, reads the defect list from said memory and from said buffer memory if the remaining part of the defect is stored therein, stores sector data corresponding to the physical sector address in said memory if the physical sector address is not in the defect list, and does not store the sector corresponding to the physical sector address in said memory if the physical sector address is in the defect list.

7. The method as claimed in claim 4, wherein:
  the data storage system is a digital optical data storage system; and
  the disk is an optical disk.

8. A method of processing data of defect sectors in a DVD-RAM (Digital Video Disk-Random Access Memory) system, comprising the steps of:
  reading a defect list in a lead-in area of a DVD-RAM disk during playback of the DVD-RAM disk, the defect list being indicative of defect areas of the DVD-RAM disk;
  storing the defect list in a predetermined area of a memory of a signal processing portion in the DVD-RAM system while the predetermined area of the memory is not full; and
  storing a remaining part of the defect list in an ATAPI (AT Attachment Packet Interface) buffer memory once the predetermined area of the memory is full.

9. The method as claimed in claim 8, wherein the memory of the signal processing portion includes a first area to store demodulated data read from the DVD-RAM disk, a second area to store data to be error corrected, a third area to store error corrected data to be read out from the DVD-RAM system, and the predetermined area.

10. A DVD-RAM system which reads a defect list read from a lead-in area of a DVD-RAM disk and from the DVD-RAM disk during a playback mode, the DVD-RAM system comprising:
  a memory which includes a first area storing demodulated data read from the DVD-RAM disk, a second area which stores data to be error corrected, a third area which stores error corrected data to be read out from the DVD-RAM system, and a fourth area of predetermined capacity which stores the defect list until the predetermined capacity is full;
  an AT Attachment Packet Interface (ATAPI) buffer memory which temporarily stores data which interfaces between the DVD-RAM system and an external device, said ATAPI buffer memory storing a remaining part of the defect list if the fourth area of said memory is full; and
  a processing unit to control the storing of the defect list in said memory and said ATAPI buffer memory.

11. The DVD-RAM system as claimed in claim 10, wherein the fourth area of said memory has the predetermined capacity of 8 sectors, each sector having 2048 bytes.

12. The DVD-RAM system as claimed in claim 10, wherein said processing unit receives a title of a file from a user, designates a physical sector address of a sector of the DVD-RAM disk having the title, reads the defect list from said memory and from said ATAPI buffer memory if the remaining part of the defect is stored therein, stores sector data corresponding to the physical sector address in said memory if the physical sector address is not in the defect list, and does not store the sector data corresponding to the physical sector address in said memory if the physical sector address is in the defect list.

13. A DVD-player which reads a defect list read from a lead-in area of a DVD-RAM disk and from the DVD-RAM disk during a playback mode, the DVD-player comprising:
  a memory which includes a first area storing demodulated data read from the DVD-RAM disk, a second area which stores data to be error corrected, a third area which stores error corrected data to be read out from the DVD-player, and a fourth area of predetermined capacity which stores the defect list until the redetermined capacity is full;
  a buffer memory which temporarily stores data which interfaces between the DVD-player and an external device, said buffer memory storing a remaining part of the defect list if the fourth area of said memory is full; and
  a processing unit to control the storing of the defect list in said memory and said buffer memory.

14. The DVD-player of claim 13, wherein said buffer memory is an AT Attachment Packet Interface (ATAPI) buffer memory.

\* \* \* \* \*

UNITED STATES PATENT AND TRADEMARK OFFICE
CERTIFICATE OF CORRECTION

PATENT NO. : 6,396,786 B2
DATED : May 28, 2002
INVENTOR(S) : Jong-Sik Jeong

It is certified that error appears in the above-identified patent and that said Letters Patent is hereby corrected as shown below:

Title page,
Item [56], References Cited, change "Tamegali" to -- Tamegai --.

Column 5,
Line 29, insert -- data -- at the beginning of the line.

Column 6,
Line 41, change "redetermined" to -- predetermined --.

Signed and Sealed this

Nineteenth Day of November, 2002

Attest:

JAMES E. ROGAN
Attesting Officer        Director of the United States Patent and Trademark Office